United States Patent [19]

Brassier et al.

[11] Patent Number: 5,349,267
[45] Date of Patent: Sep. 20, 1994

[54] LIGHTING AND/OR INDICATING APPARATUS FOR USE IN FOGGY CONDITIONS

[75] Inventors: Marc Brassier, Vincennes; Charles Rydel, Paris; Omar Medjaoui, Villemomble, all of France

[73] Assignee: Valeo Vision, Bobigny Cedex, France

[21] Appl. No.: 40,496

[22] Filed: Mar. 31, 1993

[30] Foreign Application Priority Data

Mar. 31, 1992 [FR] France .................................. 92 03886

[51] Int. Cl.⁵ .............................................. B60Q 1/02
[52] U.S. Cl. ..................................... 315/82; 315/156; 307/10.8; 362/80
[58] Field of Search .................... 315/82, 156, 159; 307/10.8; 362/80

[56] References Cited

U.S. PATENT DOCUMENTS

| | | | |
|---|---|---|---|
| 3,283,297 | 11/1966 | Pfennighausen et al. | 340/22 |
| 4,102,426 | 7/1978 | Walden | 180/98 |
| 4,728,861 | 3/1988 | Kurihara et al. | 315/82 |
| 5,039,869 | 8/1991 | Willikens | 315/82 |
| 5,143,437 | 9/1992 | Matsuno et al. | 315/156 |

FOREIGN PATENT DOCUMENTS

3637165 5/1988 Fed. Rep. of Germany .
2560353 8/1985 France .

*Primary Examiner*—John T. Kwon
*Attorney, Agent, or Firm*—Morgan & Finnegan

[57] ABSTRACT

A lighting and indicating apparatus for a motor vehicle, for use in poor visibility. The unit includes a fog lamp and apparatus for automatically detecting the presence of poor visibility. The control system for automatic control of the lighting and indicating apparatus includes a humidity detecting circuit and an optical visibility detecting circuit, the outputs from which are combined by a combining circuit, the combined signal then being processed so as to control lighting or extinction of the fog lamp.

9 Claims, 7 Drawing Sheets

FIG. 5e

LIGHTING AND/OR INDICATING APPARATUS FOR USE IN FOGGY CONDITIONS

FIELD OF THE INVENTION

The present invention relates to a lighting and/or indicating control apparatus for use in foggy conditions, and is applicable in the field of lighting and indicating apparatus for road vehicles.

BACKGROUND OF THE INVENTION

It is known that the presence of fog is a major danger on the roads. For this reason, in the prior art it has already been proposed to use lighting and/or indicating systems which in particular enable visibility to be improved under foggy conditions (as a lighting function), and which also improve the effectiveness of the various indicators of the vehicle when it is in conditions of poor visibility in relation to other vehicles. In this connection fog lamps have been developed which have optical characteristics whereby the light beams which they emit can penetrate fog more effectively than ordinary lighting and/or indicating devices.

In the prior art, the illumination (lighting) or extinction of the fog lamp is controlled manually by the driver, using a switch which is arranged on the fascia. The signal initiated by the driver in this way is processed by a central lighting and indicating control unit which controls the indicators and lights of the vehicle. When used in the absence of poor visibility, such an arrangement can be a nuisance for the users of other vehicles, and more particularly when the device concerned is a fog lamp. In addition, if the lighting and/or indicating apparatus used in poor visibility has been ignored when there is a need for its use, there is a dangerous situation.

That is why in the prior art there have been proposals for automatic systems such that a fog lamp can be lit or extinguished in response to weather conditions. In particular, optical systems have in the past been proposed which comprise an emitter/receiver for infra-red radiation of suitable wavelength, which is diffused by the fog particles. The part of this radiation which is retrodiffused (diffused back towards the vehicle) is detected, and is then compared with a threshold value in such a way as to cause the fog lamp to be lit or extinguished.

However, poor visibility results from a very varied range of physical conditions, and the above mentioned solutions do not enable all types of poor visibility situations to be detected easily under all circumstances.

DISCUSSION OF THE INVENTION

The invention proposes an apparatus of the type mentioned above which enables situations of poor visibility to be detected more accurately than with the arrangements of the prior art.

According to the invention, a lighting and/or indicating control apparatus for use in foggy conditions is characterised in that it includes a combining circuit, a first input of which is connected to the output of a device for detecting relative humidity, with a second input of the combining circuit being connected to the output of a device for detecting visibility, the two detecting signals being combined in such a way as to produce a command for illumination and/or extinction of at least one fog lamp.

Preferably, the command for lighting and/or extinction is produced by an illumination control circuit and/or a lighting and indicating central control unit.

According to a preferred feature of the invention, the visibility detecting device comprises an emitter which is connected to the terminals of an infra-red emitting diode, together with a receiver for receiving retrodiffused infra-red radiation via an infra-red radiation receiving diode.

According to another preferred feature of the invention, the receiving diode and emission diode are oriented with a predetermined angle between them, such that the emitted and received beams of infra-red radiation intersect each other at a given distance from the apparatus.

According to yet another preferred feature of the invention, the relative humidity detecting device comprises a humidity sensor disposed in a recess or well which is open into the ambient atmosphere close to the visibility detecting device.

The apparatus is preferably integrated into an optical unit.

According to still another preferred feature of the invention, the humidity detecting device includes a sensor comprising a capacitor, the dielectric constant of which depends on relative humidity, and which is supplied with power by oscillating means for generating oscillations of predetermined period, and the output signal of the sensor is compared by means of a comparator with a predetermined datum value, which is either prerecorded or adapted according to external conditions measured by a circuit, for example the degree of pollution, the ambient temperature or the atmospheric pressure.

According to another preferred feature of the invention, it includes a diode for emitting infra-red radiation and connected through an amplifier to a source of oscillations of predetermined period, which is also connected through a terminal to a module for synchronous detection, the input of which receives the retrodiffusion detection signal obtained by means of an infra-red receiving diode which is connected to the input of a gyrator, the output of the synchronous detection module being compared in a comparator, to which the said module is connected, with a predetermined datum value, which is either prerecorded or adapted according to external conditions measured by a circuit, for example the degree of pollution, the ambient temperature or the atmospheric pressure.

According to a further preferred feature of the invention, the comparison signals are combined by a diode, the combination being supplied as a control signal to the grid of a power transistor, the drain of which is connected to a supply terminal of a fog lamp, with its source being connected to ground through a resistor.

According to yet another preferred feature of the invention, it includes modules for detecting a fault in the bulb of the fog lamp, the said modules comprising a comparator connected firstly to the source of the power transistor through the resistor, and secondly to a circuit comprising a capacitor and a resistor, the output of the said comparator being, in the absence of any fault, driven to its low state by means of a diode which is connected firstly to the output terminal of the comparator and secondly through a diode to the collector of a transistor, the base of which is connected through a resistor to the power supply terminal of the bulb of the fog lamp, the output of the comparator being connected through a resistor to the grid of a transistor, the drain of which is connected to the lighting terminal of a fault warning light, whereby the said warning light becomes illuminated when the apparatus detects a fog condition with the bulb of the fog lamp being extinguished.

Further features and advantages of the present invention will appear more clearly from the description of preferred embodiments of the invention which follows, and which is given by way of example only, and with reference to the accompanying drawings.

DESCRIPTION OF PREFERRED EMBODIMENTS OF THE INVENTION

Figure 1:
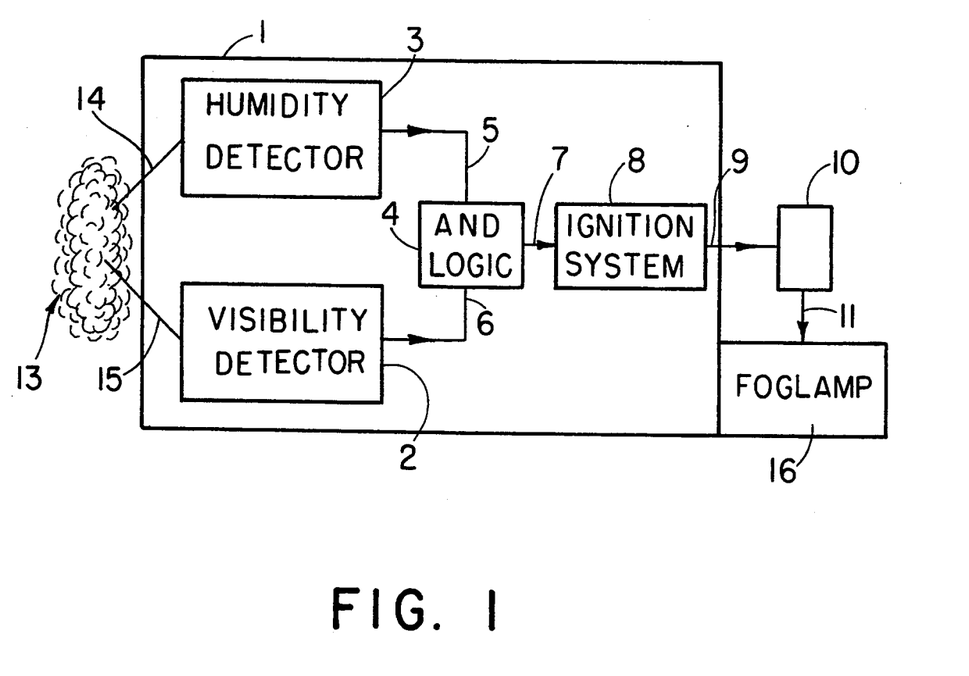
FIG. 1 is a simplified block diagram showing the principle of operation of operation of a control apparatus in accordance with the invention.

Referring first to FIG. 1, this shows a control apparatus 1 which consists mainly of a system 2 for detecting optical visibility, together with a system 3 for detecting relative humidity. The humidity detection system 3 includes a humidity sensor which detects, along an input path 14, the relative humidity in the vicinity of the device 1. Visibility in the local ambient environment 13 is measured along an input path 15 by the visibility detection system 2. For convenience the systems 2 and 3 will be referred to herein as a visibility detector and humidity detector respectively.

The apparatus 1 also includes a combining or adding circuit 4, or adder, for combining together the respective output signals 5 and 6 from the humidity detector 3 and visibility detector 2.

In one particular embodiment, the humidity detector 3 produces its output signal 5 on an all or nothing basis, while the visibility detector 2 also produces its output signal 6 on an all or nothing basis. The detectors 2 and 3 incorporate comparators for this purpose. The input signals 5 and 6 to the adding circuit 4 are accordingly binary signals, the adding circuit being arranged to apply AND logic.

Accordingly, the humidity sensor 3 and the visibility sensor 2 define predetermined changeover thresholds such that, when the output signals are combined in the adding circuit 4, the latter produces an output signal 7, the active state of which corresponds to ambient conditions in which fog (indicated at 13) is present. The output signal 7 can then be processed in an illumination control circuit or ignition system 8, the output signal of which is passed through a connecting wire 9 to a central control unit 10 for the lighting and indicating functions of the vehicle. The output signal 11 from the central control unit 10 controls the illumination and extinction of a fog lamp 16.

In the case in which the illumination control circuit 8 passes a demand signal 9 to the central control unit 10, it is possible to combine this signal 9 with a manually controlled command for illuminating the fog lamps, given by the driver of the vehicle. In this event the manual command takes priority.

It should be noted that the illumination control circuit 8 may not be connected to a central control unit 10. In that case, its output signals are taken directly to the fog lamp 16.

The predetermined values of the appropriate parameters for detection of humidity and optical visibility are pre-recorded in the control apparatus 1. In one embodiment, these predetermined, or datum, levels vary as a function of additional measurements, which may for example comprise respective measurements of atmospheric pollution, atmospheric pressure and ambient temperature. In this connection, it has been observed that the device is quite sensitive when there is a change either in the degree of pollution, or in the atmospheric pressure or ambient temperature.

Accordingly, in at least one embodiment of the invention, a circuit is used which enables the above mentioned datum levels to be adjusted in response to these three local parameters, in such a way that the control device is automatically subordinated or adapted to its environment.

Figure 2:
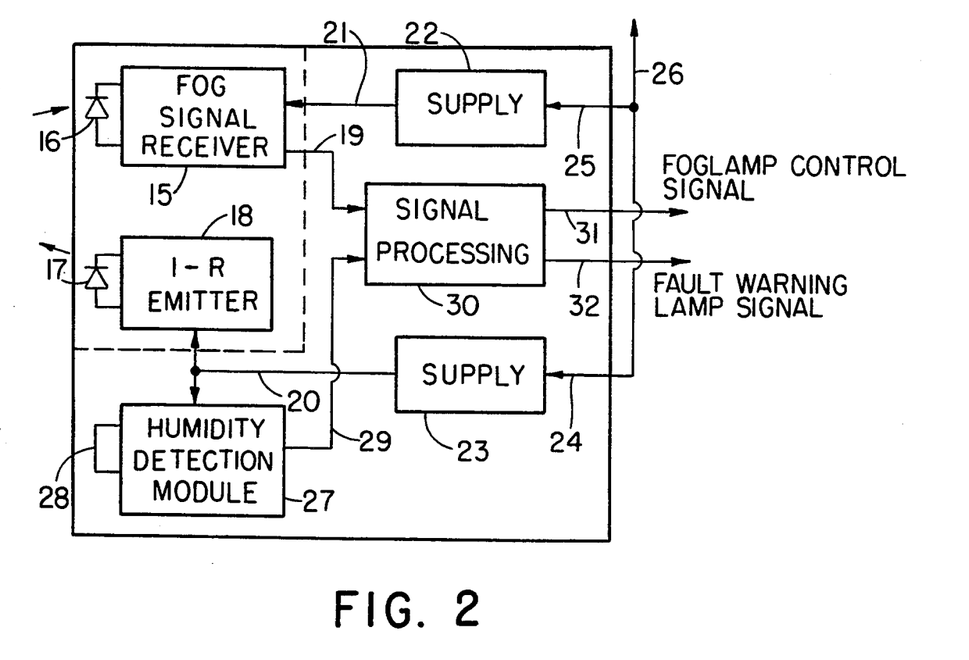
FIG. 2 is a block diagram showing a first embodiment of the apparatus shown in FIG. 1.

Referring now to FIG. 2, this shows a preferred form of part of the control apparatus generally represented in FIG. 1. The optical visibility detector 2 here comprises an infra-red radiation detector 15 to 18. This detector includes an infra-red emission means, or emitter, comprising an electronic circuit 18 for polarising an infra-red emitting diode 17. The diode 17 emits infra-red radiation, and the part of this radiation which is retrodiffused back towards the detector 2 is itself detected by an infra-red radiation detecting diode 16 which is connected across the terminals of a detection signal receiving circuit 15, which, with the diode 16, thus constitutes a fog signal receiver. The receiving circuit 15 has its own power supply, through an input 21 derived from a regulated supply source 22 which is connected through its input 25 to the positive supply line 26, derived for example from the battery of the vehicle. The circuit 15 produces a detection signal on an output line 19 which is connected to a processing circuit 30. This circuit 30 will be described in more detail below.

In addition, the control device includes a humidity sensor 28, the output signals from which are processed by a humidity detecting module 27. The output 29 of the module 27 is connected to the signal processing circuit 30. The infra-red emitter 18 and the humidity detection module 27 together receive their power supply from the output 20 of a second regulated power supply circuit 23, which is connected through its input 24 to the positive supply line 26.

The signal processing circuit 30, for processing the detection signals received along the lines 19 and 29, produces two output signals along respective output lines 31 and 32, namely a fog lamp control signal on the line 31 and a signal on the line 32 for illuminating a warning light in the event of a fault in the fog lamp.

Figure 3:
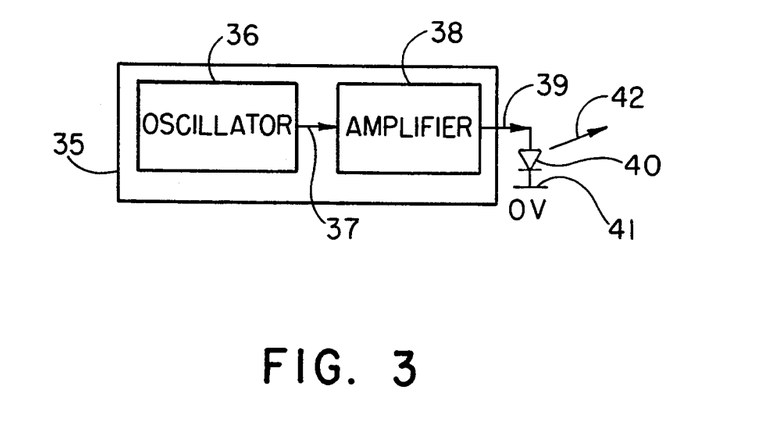
FIG. 3 is a diagram illustrating one embodiment of part of the apparatus shown in FIG. 2.

FIG. 3 shows an infra-red emitter module 35 which is suitable for an optical visibility detector in the control device here described. The emitter module 35 consists mainly of an oscillator circuit 36, the output 37 of which is connected to the input of an amplifier circuit 38. The output 39 of the amplifier 38 is connected to the anode of the infra-red emitter diode, here indicated by the reference numeral 40. The cathode of the diode 40 is connected to a constant reference level, for example a voltage of zero or the ground potential of the vehicle. The characteristics of the infra-red beam 42 emitted by the diode 40 are set by the frequency of the oscillations produced by the oscillator 36, and by the gain of the amplifier 38. They can be adjusted in accordance with the environment, as has already been described above.

Figure 4:
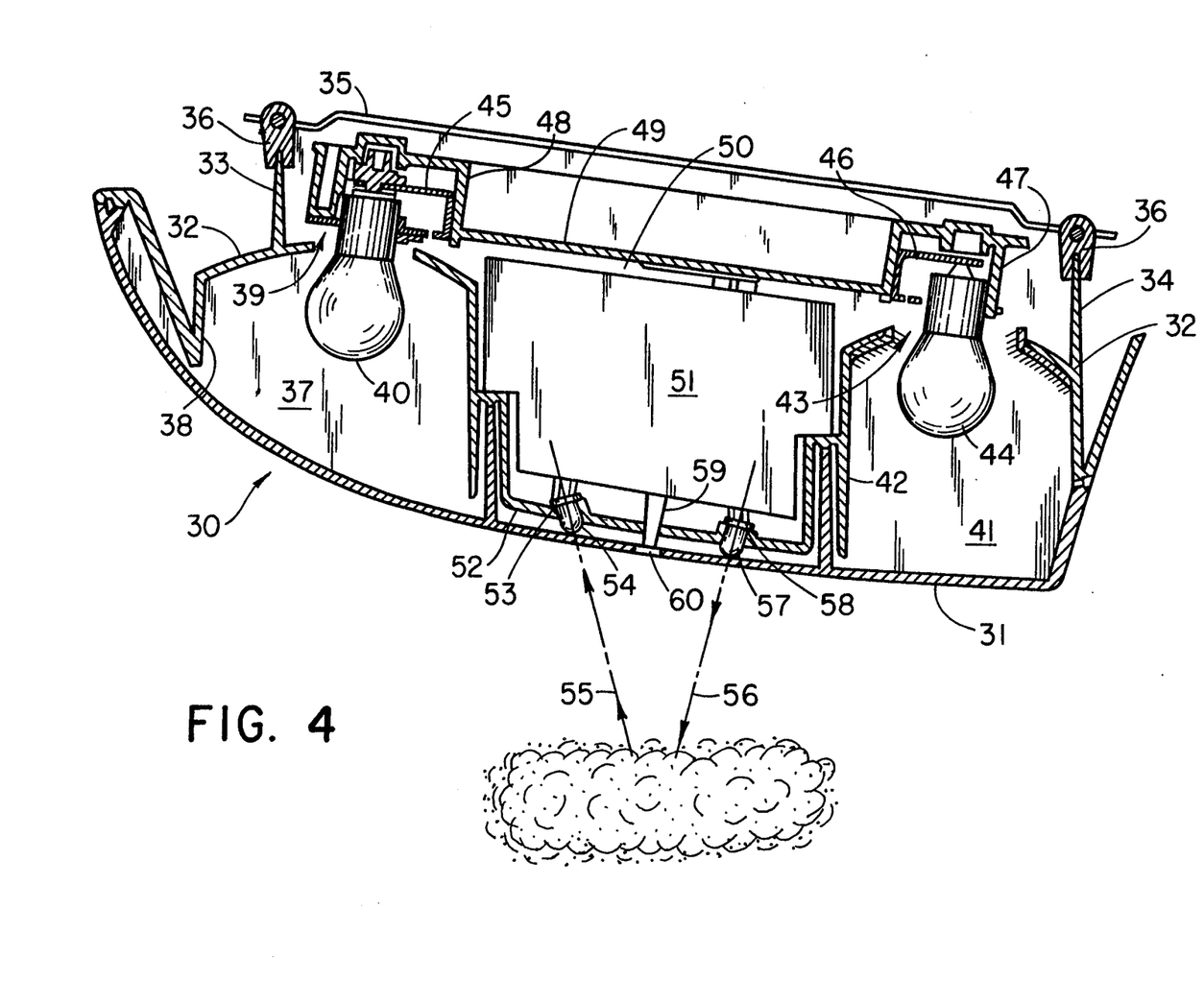
FIG. 4 shows a vehicle lighting unit in cross section, the unit being equipped with a control apparatus in accordance with the invention.

Reference is now made to FIG. 4, which shows a typical optical unit comprising a group of indicating lamps arranged to be installed at the rear of a vehicle. This unit is equipped with a control device of the kind here described. However, in other embodiments not shown, the various parts of the control device may be located in different places on the vehicle.

The optical unit 30 has an outer member 31 which is at least partly translucent, and which is fixed on an inner member 32. The inner member 32 is provided with fastening lugs 33 and 34 respectively, for securing the unit on to the bodywork 35 of the vehicle, for example by suitable fasteners 36. The unit 30 also has a first internal cavity 37 and a second internal cavity 41. The cavity 37 has a reflective wall 38, pierced by a hole 39. A lamp bulb 40, for example one of the rear lights of the vehicle, extends through the hole 39 and into the cavity 37. The second cavity 41 similarly has a reflective wall 42 with a through hole 43, with a rear fog lamp bulb 44 being mounted in the hole 43. The lamp bulbs 40 and 44 are connected electrically through tongues 45 and 46 respectively, and are located in sockets 48 and 47 respectively of a bulb carrier 49.

The control apparatus, which may be for example generally as described above with reference to FIG. 2, is indicated in FIG. 4 at 51, and is in the form of an electronic module located in the space 50 between the two cavities 37 and 41. A support member 52 is arranged over that part of the module 51 which faces toward the outer member 31 of the optical unit 30. The support member 52 has a first hole 53 in which an infra-red receiving diode 54 is accommodated, for receiving infra-red radiations retrodiffused from the infra-red radiation 56 emitted by an emitter diode 57, which is disposed in a second hole 58 formed through the support member 52.

In the embodiment shown in FIG. 4, the angle between the axes of the emitted infra-red beam 56 and the retrodiffused beam 55 is set by forming the holes 53 and 58 in such a way that these axes 55 and 56 intersect at a predetermined distance behind the rear face of the unit 30, for example 2 meters.

A recess or well 59 is arranged between the two holes 53 and 58 on the support member 52. The well 59 is open through a hole 60 in the outer member 31 of the optical unit. The humidity sensor itself is mounted in this well 59. In a preferred embodiment, the well 59 is disposed at least partially in a vertical orientation such that it is open in the upper part of the outer member 31.

The various electrical supply and connection wires between different components are not shown in FIG. 4.

Figure 5A:
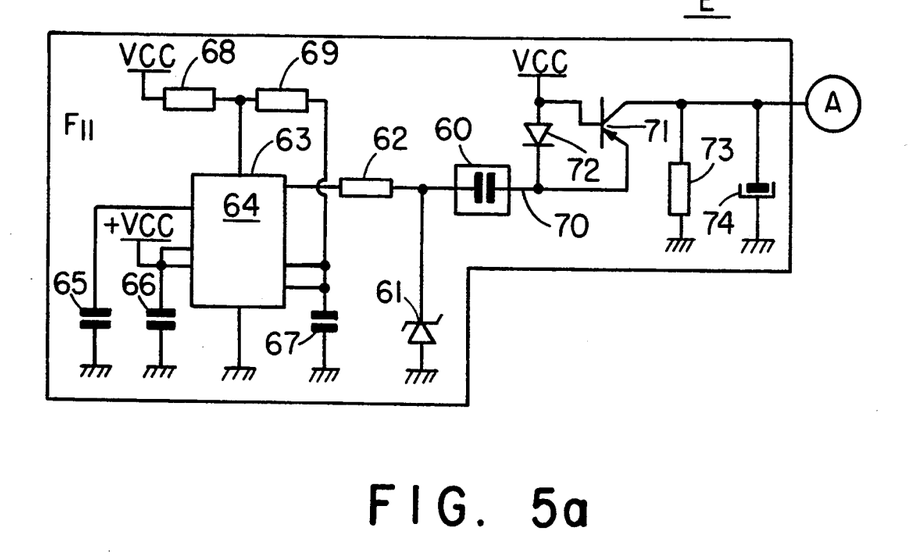
FIG. 5 consists of five circuit diagrams, FIGS. 5a to 5e, showing various parts of the electronic circuitry of the control apparatus according to the invention, in the form of a module.
Figure 5B:
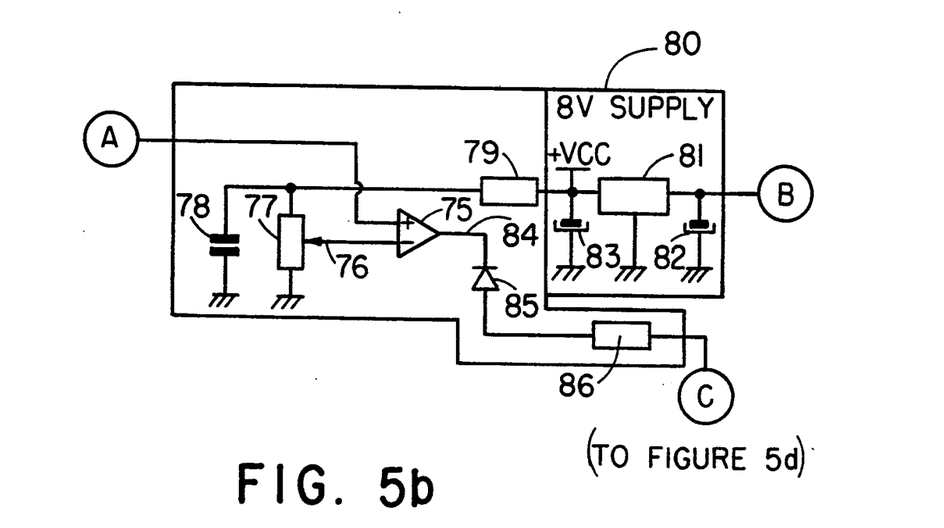

Referring now to FIG. 5, FIGS. 5a and 5b show the humidity detecting circuit with its reference power supply. The part of the circuitry which is shown in FIG. 5a constitutes a module F11. The humidity sensor 60 here consists of a polymer film which is used as the dielectric of a capacitor, having a dielectric constant which is responsive to ambient humidity. Such an ambient temperature sensor has an almost linear response curve in terms of the capacitance across its terminals as a function of the percentage relative humidity in air. A first terminal of the sensor 60 is connected to the cathode of a Zener diode 61, the anode of which is connected to ground M. The cathode of the diode 61 is connected through a resistor 62 to the output 63 of an integrated circuit oscillator 64. The oscillator circuit 64 is polarised by means of capacitors 65, 66 and 67, and by resistors 68 and 69, at the unidirectional system voltage +Vcc.

The output 63 of the integrated circuit 64 supplies the sensor 60 with a square wave signal having a frequency lying between 30 and 300 kHz, and which in the preferred arrangement is 30 kHz. The other terminal of the sensor 60 is connected, via a transistor 71 the base of which is connected to its emitter through a diode 72, to a load which consists of a parallel circuit comprising a resistor 73 and a capacitor 74. The output A of this circuit is connected to the positive input (see FIG. 5b) of an operational amplifier 75, which is connected as a reference voltage comparator. The other, negative, input of the amplifier 75 is connected to the output 76 of a potentiometer 77, which is mounted in parallel with a capacitor 78. The common point on the potentiometer 77 and capacitor 78 is connected through a load resistor 79 to a voltage stabilising circuit 88 that gives a stabilised reference voltage. The voltage stabiliser 80 is constructed around an integrated circuit voltage regulator 81, the input of which, derived via an input B, is filtered by a capacitor 82. The output Vcc of the voltage regulator 81, and therefore of the voltage stabiliser 80, provides a voltage reference across a further capacitor 83.

The datum point or level for humidity detection is adjusted by means of the potentiometer 77. In one embodiment, this datum value is regulated to a value of relative humidity which is close to saturation, for example 85%. When the humidity detected by the sensor 60 exceeds 85%, the output 84 of the comparator 75 passes to the high state. The output 84 is connected to the cathode of a diode 85, the anode of which is connected to the first side of a resistor 86. The other side of the latter is connected to an output C in FIG. 5b. The output C is the input to the circuit shown in 5d which will be described below.

Figure 5C:
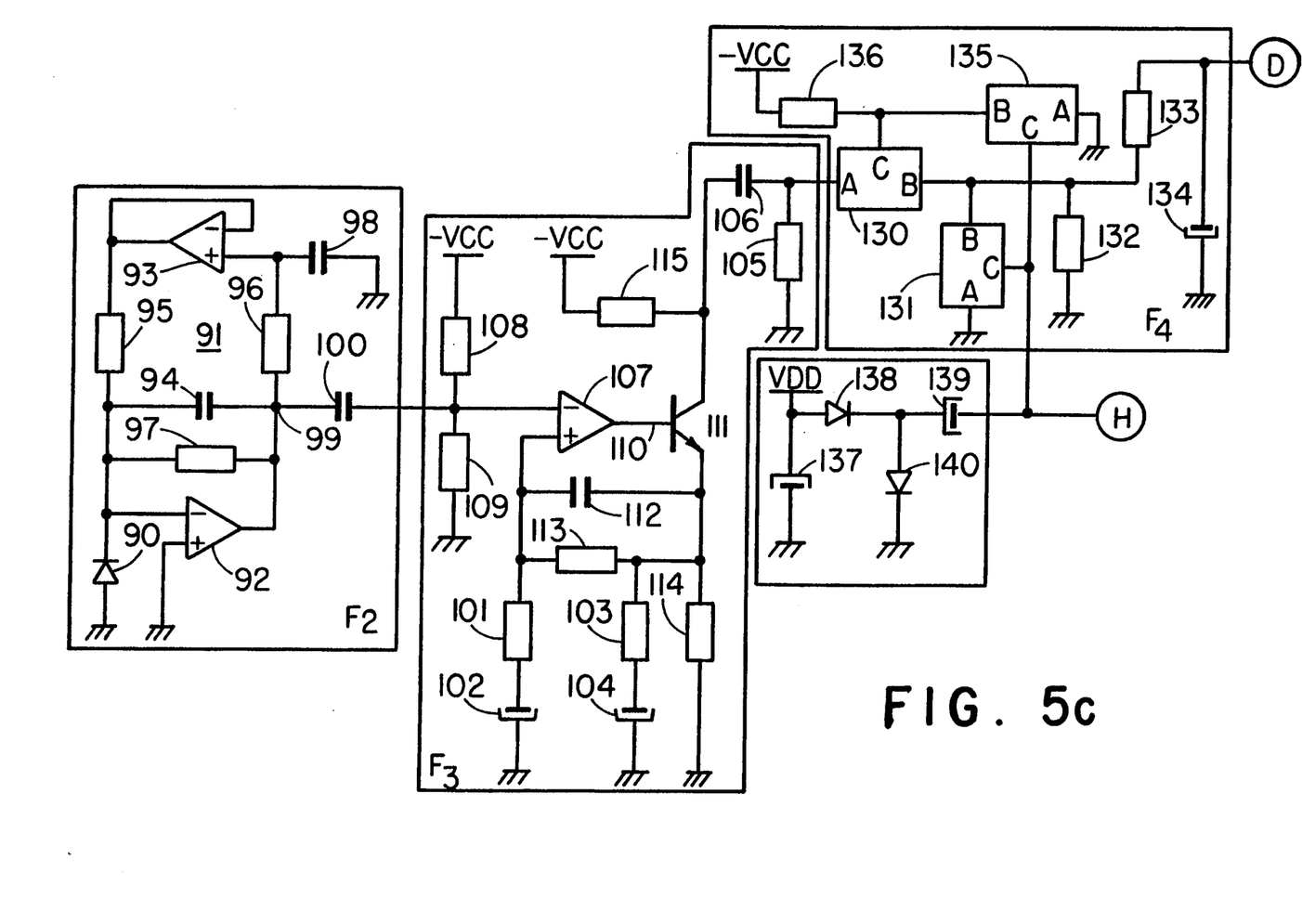
Figure 5D:
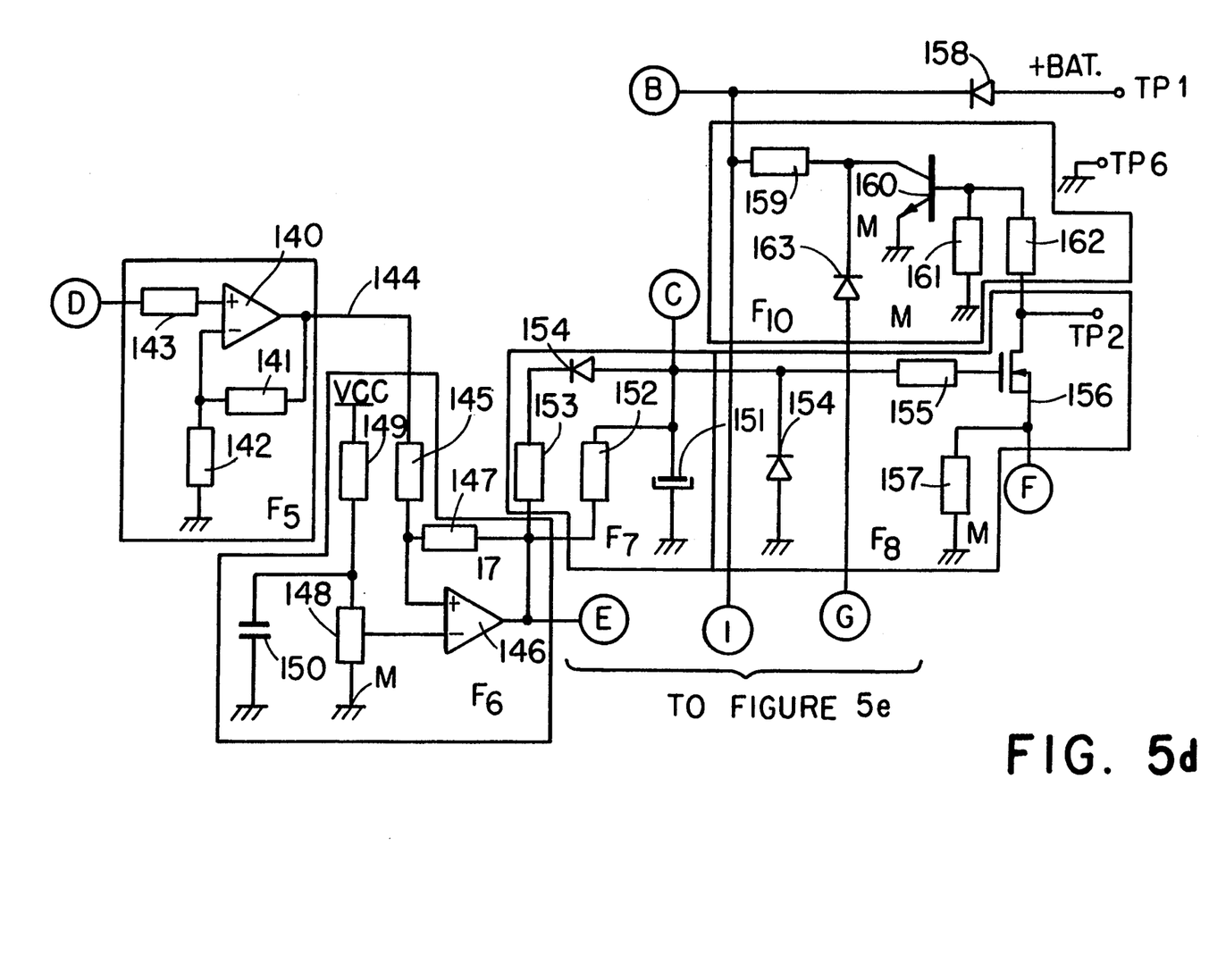

Reference will however first be made to FIG. 5c, which shows a module F2 which contains the infra-red receiving diode, here indicated at 90. The cathode of this diode is connected to the input of a gyrator 91, which consists of a first amplifier 92 and a second, follower, amplifier 93. The gain is determined by resistors 95, 96 and 97. A circuit comprising a capacitor 94 and a resistor 97 acts as a low pass filter. When the diode 90 is energised by a retrodiffused (or return) infra-red signal, the output signal on the terminal 99 of the gyrator 91 is proportional to the intensity of the return signal.

The infra-red return signal is transmitted to a filter block F3 through a coupling capacitor 100. The block, or module, F3 acts as a filter for parasitic sources such as daylight, headlamp beams of neighbouring vehicles, and street lighting or road tunnel lighting. If the module F3 were absent, the response of the receiver F2 would be modified and would also modify the signal to noise ratio. In order to overcome this problem, a chain of high pass filter circuits is used. This chain comprises a resistor 101 in series with a capacitor 102; a resistor 103 in series with a capacitor 104; and a resistor 105 connected to a capacitor 106.

The infra-red return signal is transmitted to the input of an amplifier 107. A unidirectional voltage is superimposed on this signal, this voltage being fixed by the ratio of a divider bridge 108, 109 which is connected between the positive supply +Vcc and ground.

The output 110 of the amplifier 107 is passed to the base of a transistor 111. The resistors 101 and 103 are connected through a resistor 113, while a capacitor 112, in parallel with the resistor 113, is connected between the negative input terminal of the amplifier 107 and the emitter of the transistor 111. The first filter circuits 101 to 104 are connected in the counter-reaction loop with the capacitor 112, through the resistor 113. The emitter of the transistor 111 is connected to ground through a resistor 114.

The collector of the transistor 111 is connected firstly to the positive supply +Vcc through a resistor 115, and to the input of the filter circuit 106, 105 which filters low frequencies in a high pass mode. The output of this filter 106, 105 is passed to the input of a module F4 which works as a synchronous detection filter. This enables a signal deriving from the retrodiffusion of infra-red radiation from fog to be detected. Because this signal comes from the radiation emitted by another infra-red diode, it can be detected in synchronism with the production of the same infra-red radiation.

Figure 5E:
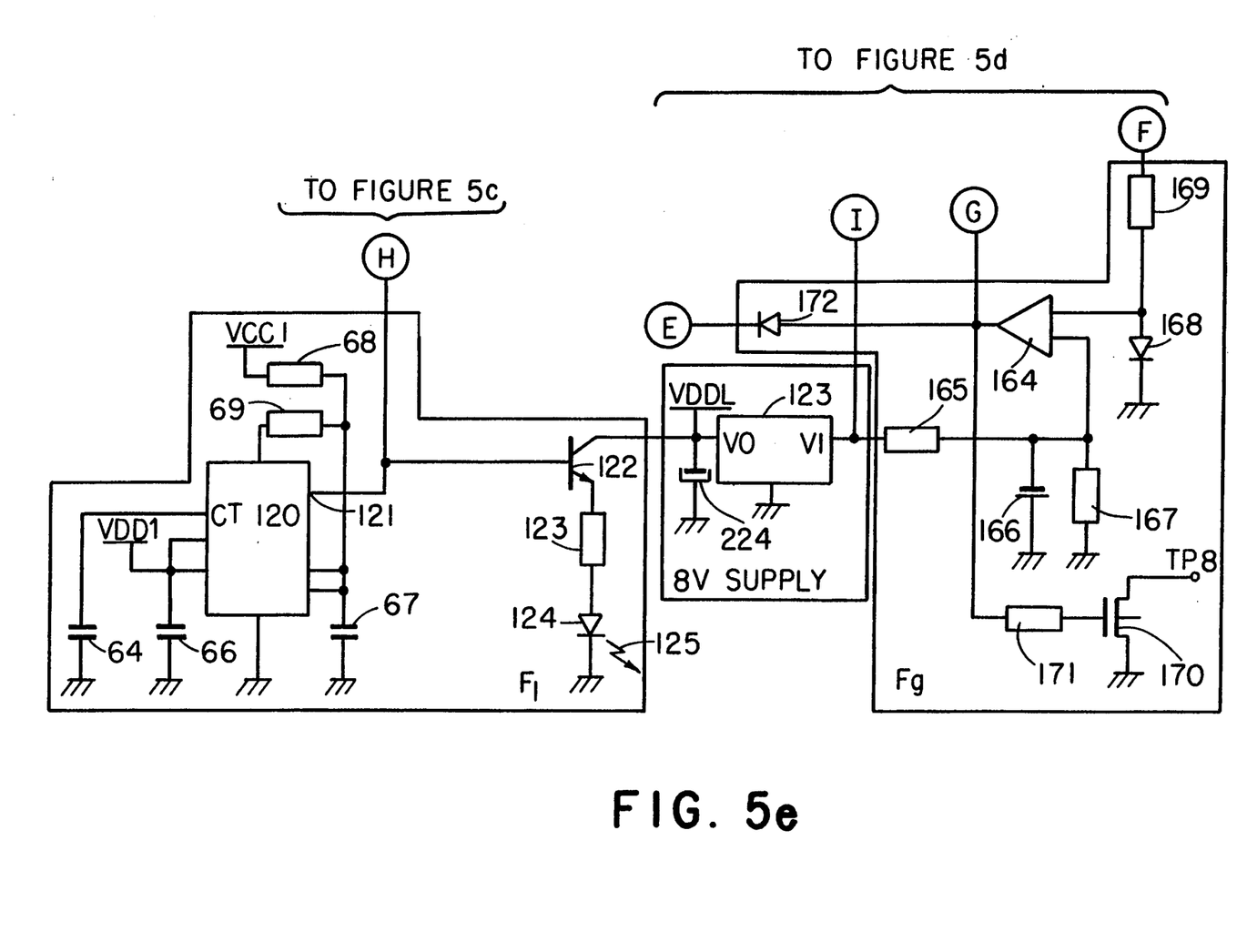

FIG. 5e shows one particular module F1 for producing an infra-red beam. This module includes an oscillator 120 in the form of an integrated circuit. The connections of this oscillator are substantially similar to those of the oscillator 64 in the module F11 of FIG. 5a. The same elements carry the same reference numerals (even though their values may be different), and will not be described again here. The output 121 of the oscillator 120 is taken to the base of a transistor 122 and to the output H which is connected to the corresponding input H in FIG. 5c.

The transistor 122 is supplied with a positive potential produced by a voltage regulated supply source comprising a regulating circuit 123, the output VO of which is taken to a capacitor 224. The emitter of the transistor 122 is connected through a resistor 123 to the anode of an infra-red emitter diode 124, the cathode of which is connected to ground.

Reverting now to FIG. 5c, the input H receives a signal from the oscillator 120 of FIG. 5e. This signal acts as a synchronising reference for the synchronous detection filter F4. The latter comprises a multiplier for the output signal from the parasite filter module F3, which is taken from the common point between the capacitor 106 and the resistor 105. In the embodiment shown in FIG. 5c, this multiplier comprises three switches. The first of these switches, 130, has a first terminal A which is connected to the common point between the capacitor 106 and the resistor 105, and a second terminal B. This terminal B is connected both to a first terminal B of the second switch, 131, and to a circuit comprising two resistors 132 and 133. The switch 131 has another terminal A which is connected to ground. The resistor 133 is connected to a first side of a capacitor 134, and to the output D of the filter module F4. The circuit consisting of the resistor 133 and capacitor 134 constitutes an integrator, which produces a unidirectional voltage, corresponding to a mean integral voltage, across the capacitor 134.

The input H is connected to the control terminals C of the second switch 131 and of the third switch, 135. The switch 135 has a first terminal A which is connected to ground, and a second terminal B which is connected to the control input C of the first switch 130, and also to one side of a resistor 136. The other side of the resistor 136 is connected to the positive supply +Vcc.

The module F4 gives synchronous detection of the infra-red return beam detection signal. By opening or closing the switch 130, the return beam detection signal is multiplied by the synchronous clock. Accordingly, a mean voltage is measured at the output D of the integrating circuit 133, 134, this mean voltage varying with the cosine of the phase difference between the infra-red return beam detection signal and the synchronising signal at H. This mean voltage is at a maximum when the phase difference is equal to 0 degrees or 180 degrees.

The input terminal H for the synchronising signal is also connected to a circuit comprising two diodes 138 and 140, together with capacitors 137 and 139. This circuit operates as a diode pump to produce a polarising voltage VDD, which is passed to the other electronic circuits of the fog lamp control unit.

Reference is now made to FIG. 5d. The output signal D from the synchronous detection filter module F4 in FIG. 5c is amplified in a unidirectional component by an operational amplifier 140. The gain of this amplifier is regulated by means of a counter-reaction resistor 141 and a resistor 142 which is connected to ground. The input signal D is connected through a further resistor 143 to the positive input of the amplifier 140. These components constitute a module F5, the output of which, being the output of the amplifier 140, is passed through a resistor 145 to the positive input terminal of a further operational amplifier 146, the positive reaction loop of which comprises a resistor 147. The negative terminal of the amplifier 146 receives a datum value which is regulated by a potentiometer 148 connected between ground and the positive supply terminal Vcc, the connection to the latter being via a resistor 149. The potentiometer 148 is connected in parallel with a filter capacitor 150. In one embodiment, the datum value source is controller at a predetermined value which is obtained by experiment, and which is such as to energise the fog lamp when the visibility is less than 50 meters. In another embodiment, the datum value set by the potentiometer 148 is adjusted according to external conditions, for example the degree of pollution, atmospheric pressure and ambient temperature.

The circuit just described, receiving the output 144 from the input module F5, constitutes a module F6.

The module F6 operates as a comparator, the output E of which is operative when the voltage detected on the infra-red diode 90 exceeds the predetermined datum value.

In order to prevent inappropriate illumination or extinction of the fog lamp, a time delay module F7 is arranged on the output of the comparator F6. The main component of the module F7 is a capacitor 151, a first terminal of which is connected to ground, with its other terminal being connected to a first resistor 152 and to a circuit consisting of a resistor 153 in series with a diode 154. The common point between the capacitor 151, the resistor 152 and the anode of the diode 154 is connected to an input C. The input C is connected, as shown in FIG. 5b, to the anode of a diode 85, via a resistor 86. As a result, the output 84 of the relative humidity detecting circuit F11 (FIG. 5a) is combined, by an AND logic circuit, with the visibility comparison signal E.

The above mentioned common point is connected to a further module F8, FIG. 5d. This module includes a diode 154, the anode of which is connected through a resistor 155 to the grid of a power transistor 156. The drain of this transistor 156 is connected to one terminal TP2 of the fog lamp, while its source is connected through a resistor 157 to ground M. The drain of the power transistor 156 is connected, via a further module F10 which will be described below, to the cathode of a diode 158. The anode of the diode 158 is connected to a terminal TP1, which is in turn connected to the positive terminal of the battery of the vehicle.

If one or other of the two conditions of visibility and relative humidity is not satisfied, the transistor 156 is blocked. Accordingly, current does not flow to ground through the resistor 157. In that case, the fog lamp is extinguished. However, when the two conditions are verified, the transistor 156 becomes saturated, and the fog lamp is illuminated.

The modules F9 and F10 in FIGS. 5e and 5d respectively will now be described. This part of the control apparatus, such as the electronic module 51 in FIG. 4, serves the purpose of indicating a fault if something happens to the bulb of the fog lamp. In that event, the bulb may be burnt out. A warning lamp is then lit, for example on the fascia of the vehicle.

The module F10 includes a first resistor 159 which is connected to a terminal I and to the cathode of a diode 158. The other side of the resistor 159 is connected to the collector of a transistor 160, the emitter of which is connected to ground M. The base of the transistor 120 is connected, firstly to ground M through a resistor 161, and secondly to the supply terminal TP2 of the bulb of the fog lamp through a resistor 162. The module F10 is also connected to a diode 163, the anode of which is connected to an input G of the module F9.

The connecting terminal I (mentioned above) of the module F10 is connected to the input terminal VI of the regulator circuit 123 in FIG. 5e, described above. The terminal I is also connected to a signal input of a comparator 164 of the module F9, through a resistor 165 which is connected to a parallel circuit consisting of a capacitor 166 and a resistor 167. The negative input of the comparator 164 is connected to the common point between the anode of a diode 168 and one side of a resistor 169. The other side of the resistor 169 is connected to a connecting terminal F, whereby the module F9 is connected to the module F8 in FIG. 5d. The output of the comparator 164 controls switching of a power transistor 170, the drain of which is connected to a terminal TP8 for lighting or extinguishing the warning light mentioned above. To this end, the output of the comparator 164 is connected to the grid of the transistor 170 through a resistor 171. In addition, the output of the comparator 164 is connected first to the module F10 (via the connection G), and secondly to the module F6 in FIG. 5d, through a diode 172 and the connecting terminal E.

In the absence of any fog, the transistor 156 is blocked, and current does not flow in the resistor 157. The output of the comparator 164 is therefore in the high state. However, since the transistor 160 is saturated, and the comparator 146 of the module F6 is in the low state, the output of the comparator 164 is driven to its low state by means of the diodes 172 and 163. Accordingly, the transistor 170 is never able to become saturated when there is no fog; therefore the fault warning light cannot be illuminated.

By contrast, when the system detects fog, the transistor 156 becomes saturated and current flows to ground through the resistor 157. The output of the comparator 164 therefore passes to zero potential. The diodes 163 and 172 then behave as open circuits. In this case, if the bulb blows in the fog lamp, the output of the comparator 164 changes to its high state. The transistor 170 becomes saturated, and the fault light connected to the terminal TP8 lights up.

What is claimed is:

1. A fog lamp unit in a vehicle, comprising a combining circuit having a first input and a second input, a relative humidity detecting device having an output connected to said first input of the combining circuit, and a visibility detecting device having an output connected to said second input of the combining circuit, said combining circuit having an output for connection to at least one fog lamp unit of the vehicle, whereby the combining circuit combines signals received from said detecting devices so as to produce command signals for illumination and extinction of said at least one fog lamp unit of the vehicle.

2. A fog lamp unit in vehicle according to claim 1, further including means connected between said combining circuit and said at least one fog lamp for generating said command signals, said means being selected from the group comprising an illumination control circuit, a lighting and indicating central control unit, and a combination of said illumination control circuit and said central control unit.

3. A fog lamp unit for a vehicle according to claim 1, further defining a cavity open to the ambient atmosphere in relative proximity to the visibility detecting device, and including a humidity sensor in said cavity.

4. A fog lamp unit in a vehicle comprising, a combining circuit having a first input and a second input, a relative humidity detecting device having an output connected to said first input of the combining circuit, and a visibility detecting device having an output connected to said second input of the combining circuit, said combining circuit having an output for connection to at least one fog lamp unit of the vehicle, whereby the combining circuit combines signals received from the said detecting devices so as to produce command signals for illumination and extinction of said at least one fog lamp unit of the vehicle, wherein the visibility detecting device comprises an emitter connected to the terminals of an infra-red emitting diode, said diode emitting a beam of infra-red radiation, and further comprising infra-red radiation receiving means for receiving said infra-red radiation as said radiation is retrodiffused towards said receiving means, said receiving means comprising an infra-red receiving diode.

5. A fog lamp unit for a vehicle according to claim 4, including means mounting said emitting and receiving diodes to define respective axes of the beams emitted and received respectively, with said respective axes intersecting at a predetermined distance from the diodes.

6. A fog lamp unit for vehicle according to claim 4, further comprising: a synchronous detection module having an input connected to the infra-red receiving diode, for receiving from said diode the retrodiffused radiation detection signal, said detection module having an output; an oscillator for generating oscillations of predetermined period, said oscillator connected to the synchronous detection module; and an amplifier connecting the infra-red emitting diode to said oscillator; second datum value setting means connected to a second comparator which is also connected to the output of the synchronous detection module for comparing output signals from the synchronous detection module with a second datum value set by the second setting means.

7. A fog lamp unit in a vehicle comprising, a combining circuit having a first input and a second input, a relative humidity detecting device having an output connected to said first input of the combining circuit, and a visibility detecting device having an output connected to said second input of the combining circuit, said combining circuit having an output for connection to at least one fog lamp unit of the vehicle, whereby the combining circuit combines signals received from the said detecting devices so as to produce command signals for illumination and extinction of said at least one fog lamp unit of the vehicle, wherein the humidity detecting device comprises a sensor consisting of a first capacitor having a dielectric constant dependent upon the relative humidity, and an oscillator for generating oscillations of predetermined period, the sensor being connected to said oscillator for receiving said oscillations, and further comprising first datum value setting means connected to a first comparator which is also connected to the sensor for comparing the output signals from the sensor with a first datum value predetermined by the first setting means.

8. A fog lamp unit in a vehicle comprising, a combining circuit having a first input and a second input, a relative humidity detecting device having an output connected to said first input of the combining circuit, and a visibility detecting device having an output connected to said second input of the combining circuit, said combining circuit having an output for connection to at least one fog lamp unit of the vehicle, whereby the combining circuit combines signals received from the said detecting devices so as to produce command signals for illumination and extinction of said at least one fog lamp unit of the vehicle, wherein the humidity detecting device comprises a sensor consisting of a first capacitor having a dielectric constant which depends on the relative humidity, and an oscillator for generating oscillations of predetermined period, the sensor being connected to said oscillator for receiving said oscillations, and further comprising first datum value setting means connected to a first comparator which is also connected to the sensor for comparing the output signals from the sensor with a first datum value predetermined by the first setting means, wherein the visibility detecting device comprises an emitter connected to the terminals of an infra-red emitting diode, whereby said diode causes a beam of infra-red radiation to be emitted, and further comprising infra-red radiation receiving means for receiving said infra-red radiation when said radiation is retrodiffused towards said receiving means, said receiving means comprising an infra-red receiving diode, and further including: a synchronous detection module having an input connected to the infra-red receiving diode, for receiving therefrom the retrodiffused radiation detection signal, said module having an output; and oscillator for generating oscillations of predetermined period, connected to the synchronous detection module; an amplifier connecting the infra-red emitting diode to said oscillator; second datum value setting means connected to a second comparator which is also connected to the output of the synchronous detection module for comparing output signals from the synchronous detection module with a second datum value set by the second setting means, the unit further including: a first diode connected to said first and second comparators for combining the comparison signals therefrom; power transistor having a grid connected to said first diode or receiving signals representing the combination of said comparison signals as control signals; a power supply terminal for a fog lamp connected to the drain of said power transistor; and a first resistor connecting the source of said power transistor to ground.

9. A fog lamp unit for a vehicle according to claim 8, further including fault detection modules for detecting a fault in a bulb of the fog lamp, a fault warning light and a supply terminal of said fault warning light, the fault detection modules comprising: a third comparator; a second resistor connecting the third comparator to the source of said power transistor; a circuit comprising a second capacitor and a third resistor connected to the third comparator; a second diode connected to the output of the second comparator; a first transistor; a third diode connecting the collector of the first transistor to the output of the third comparator; a fourth resistor connecting the base of the first transistor to the supply terminal of the fog lamp; a second transistor having its drain connected to the supply terminal of the warning lamp; and a fifth resistor connecting the output of the third comparator to the grid of the second transistor, whereby the second diode drives the third comparator, into a low state in the absence of a fault, and whereby the warning lamp is lit when the system detects a fog condition with the fog lamp extinguished.

* * * * *

UNITED STATES PATENT AND TRADEMARK OFFICE
CERTIFICATE OF CORRECTION

PATENT NO. : 5,349,267
DATED : September 20, 1994
INVENTOR(S) : Marc Brassier

It is certified that error appears in the above-indentified patent and that said Letters Patent is hereby corrected as shown below:

In claim 8, column 12, line 21, insert -- a -- before the word "power" and in line 22, delete the word "or" and insert therefor the word -- for --.

Signed and Sealed this

Seventh Day of March, 1995

Attest:

BRUCE LEHMAN

*Attesting Officer*     *Commissioner of Patents and Trademarks*